(12) United States Patent
Osorio et al.

(10) Patent No.: US 8,044,969 B2
(45) Date of Patent: Oct. 25, 2011

(54) REFLECTANCE SPECTRA ESTIMATION AND COLOUR SPACE CONVERSION USING REFERENCE REFLECTANCE SPECTRA

(75) Inventors: Daniel Robert Colaco Osorio, Lewes (GB); John Conrad Anderson, Brighton (GB)

(73) Assignee: Chrometrics Limited (GB)

( * ) Notice: Subject to any disclaimer, the term of this patent is extended or adjusted under 35 U.S.C. 154(b) by 815 days.

(21) Appl. No.: 11/885,705

(22) PCT Filed: Feb. 24, 2006

(86) PCT No.: PCT/GB2006/000639
§ 371 (c)(1),
(2), (4) Date: Oct. 31, 2007

(87) PCT Pub. No.: WO2006/092559
PCT Pub. Date: Sep. 8, 2006

(65) Prior Publication Data
US 2009/0128649 A1    May 21, 2009

(30) Foreign Application Priority Data
Mar. 4, 2005  (GB) .................................. 0504520.8

(51) Int. Cl.
| | |
|---|---|
| H04N 1/46 | (2006.01) |
| H04N 1/60 | (2006.01) |
| H04N 5/228 | (2006.01) |
| G06T 1/00 | (2006.01) |
| G06K 9/00 | (2006.01) |
| G06K 9/32 | (2006.01) |
| G09G 5/00 | (2006.01) |
| G09G 5/02 | (2006.01) |
| G06K 9/40 | (2006.01) |

(52) U.S. Cl. ........ 345/604; 345/428; 345/581; 345/591; 345/606; 348/254; 348/488; 348/557; 348/671; 358/518; 358/522; 358/523; 382/162; 382/254; 382/274; 382/300

(58) Field of Classification Search .......... 345/427–428, 345/581, 586, 589–591, 600, 604, 606, 616, 345/619, 643, 440–441, 549; 348/222–223, 348/253–254, 488, 557, 560, 567, 617, 630, 348/671–674; 358/518–519, 522–523
See application file for complete search history.

(56) References Cited

U.S. PATENT DOCUMENTS
5,771,311 A    6/1998    Arai .............................. 382/162
(Continued)

FOREIGN PATENT DOCUMENTS
EP    0 781 036    6/1997
(Continued)

OTHER PUBLICATIONS

Chiao et al., "Characterization of natural illuminants in forests and the use of digital video data to reconstruct illuminant spectra," Journal of the Optical Society of America, vol. 17, No. 10, pp. 1713-1721, Oct. 2000.
(Continued)

Primary Examiner — Wesner Sajous
(74) Attorney, Agent, or Firm — Ballard Spahr LLP (57) ABSTRACT

A Personal Computer (PC) adjusts a color of an image received from a digital camera to produce an estimated reflectance spectrum and/or to convert the color to a new color space. First, an input compensation transform is generated, e.g. based on a Macbeth color chart in the image, to compensate for the sensitivity of the camera used to generate the image to different wavelengths of light and the illumination spectrum incident on an object of interest to which the image relates. In order to estimate the reflectance spectrum, a reflectance spectrum estimation transform is then generated by the PC. In order to convert the color of the image to the new color space, a color space conversion transform is generated by the PC. Both the reflectance spectrum estimation transform and the color space conversion transform are based on the input compensation transform and reference reflectance spectra stored in a reference reflectance spectra database.

76 Claims, 5 Drawing Sheets

U.S. PATENT DOCUMENTS

| | | | |
|---|---|---|---|
| 6,208,749 B1 * | 3/2001 | Gutkowicz-Krusin et al. | 382/128 |
| 6,584,435 B2 * | 6/2003 | Mestha et al. | 702/196 |
| 6,587,793 B2 * | 7/2003 | Viassolo et al. | 702/27 |
| 6,856,354 B1 | 2/2005 | Ohsawa | 348/370 |
| 6,980,231 B1 | 12/2005 | Ohsawa | 348/188 |
| 2002/0054237 A1 | 5/2002 | Nichogi | 348/453 |
| 2003/0185438 A1 | 10/2003 | Osawa et al. | 382/162 |
| 2004/0017586 A1 * | 1/2004 | Nichogi | 358/2.1 |
| 2004/0206914 A1 * | 10/2004 | Schomacker et al. | 250/458.1 |
| 2004/0207625 A1 * | 10/2004 | Griffin et al. | 345/440 |
| 2004/0208385 A1 * | 10/2004 | Jiang | 382/254 |
| 2006/0221341 A1 * | 10/2006 | Paul et al. | 356/406 |

FOREIGN PATENT DOCUMENTS

| | | |
|---|---|---|
| EP | 1 231 776 | 8/2002 |
| EP | 1 439 716 | 7/2004 |
| JP | 2000-341715 | 8/2000 |
| JP | 2001-008220 | 1/2001 |
| JP | 2002-185803 | 6/2002 |
| JP | 2004-64543 | 2/2004 |
| WO | WO 03/029766 | 4/2003 |
| WO | WO 03/030524 | 4/2003 |
| WO | WO 2004/012442 | 5/2004 |

OTHER PUBLICATIONS

Haneishi et al., "System design for accurately estimating the spectral reflectance of art paintings," Applied Optics, vol. 39, No. 35, pp. 6621-6632, Dec. 10, 2000.

Marimont et al., "Linear models of surface and illuminant spectra," Journal of the Optical Society of America, vol. 9, No. 11, pp. 1905-1913, Nov. 1992.

Vorobyev et al., "Flowers Through Insect Eyes," Israel Journal of Plant Sciences, vol. 45, pp. 93-101, 1997.

Finlayson et al "Recovering Device Sensitivities with Quadratic Programming", Sixth Color Imaging Conference: Color Science, Systems and Applications, Scottsdale, Arizona, Nov. 1998; p. 90-95; ISBN 0-89208-213-5.

Imai, Fransisco H. "Multi-spectral Image Acquisition and Spectral Reconstruction using a Trichromatic Digital Camera System Associated with Absorption Filters", Munsell Color Science Laboratory, Rochester Institute of Technology, 1998.

Zhang et al "Bayesian Color Correction Method for Non-Colorimetric Digital Image Sensors" Twelfth Color Imaging Conference: Color Science, Systems and Applications, Scottsdale, Arizona, Nov. 2004; p. 308-314; ISBN 0-89208-254-2.

* cited by examiner

REFLECTANCE SPECTRA ESTIMATION AND COLOUR SPACE CONVERSION USING REFERENCE REFLECTANCE SPECTRA

CROSS REFERENCE TO RELATED APPLICATIONS

The present application is a National Phase Application of International Application No. PCT/GB2006/000639, filed Feb. 24, 2006, which claims priority to Great Britain Patent Application No. 0504520.8, filed Mar. 4, 2005, which applications are incorporated herein fully by this reference.

FIELD OF THE INVENTION

This invention relates to reflectance spectra estimation and colour space conversion using reference reflectance spectra. More specifically, but not exclusively, the invention relates to a method and apparatus for generating a transform for adjusting a colour of an image, e.g. a reflectance spectrum estimation transform or a colour space conversion transform, and to related methods and apparatus for estimating a reflectance spectrum and for converting a colour of an image to a new colour space using the generated transform(s).

BACKGROUND TO THE INVENTION

Colours can be deterministically defined by a distribution of light intensities at different wavelengths in the visible spectrum (i.e. between around 400 nm and 700 nm). However, the way in which we perceive and usually record colour is subjective. For example, our eyes and most conventional photographic methods are more sensitive to light at some wavelengths than others. This means that light at certain wavelengths has greater influence on our perception or recordal of colour than others. Similarly, whilst an object tends to reflect light at different wavelengths by consistent proportions defined by the reflectance spectrum of the object, the actual colour of light reflected by the object also depends on the intensity at different wavelengths of light by which the object is illuminated, e.g. the illumination spectrum. As the illumination spectrum will tend to change, e.g. according to the time of day or according to the location of the object, the object may therefore be perceived or photographed with a variety of different colours. So, it is widely recognised that colours of objects can only be completely defined by their reflectance spectra. Much effort has therefore been expended in developing methods of recording and estimating reflectance spectra. These recorded or estimated reflectance spectra are useful for a variety of scientific and technical purposes. They can also be used for image processing. For example, it has been suggested to convert images of objects recorded in a given colour space, e.g. a Red Green Blue (RGB) signal of a digital camera, to another colour space, e.g. Cyan Magenta Yellow black (CMYK) ink dot quantities of a printer, using the estimated reflectance spectra of the objects.

For example, reflectance spectra can be measured using an apparatus known as a spectroradiometer or spectrophotometer. The spectrophotometer splits light reflected from an object into different component wavelengths, e.g. using a prism or diffraction grating, and measures the light intensity at each component wavelength. The illumination spectrum incident on the object is usually also measured, e.g. by measuring light reflected from an object having neutral reflectance characteristics, such as a piece of matt white card. The reflectance spectrum of the object can then be deduced. Whilst this is generally effective, spectrophotometers are complex and expensive. They are also poor at generating images. More specifically, in order to generate a two-dimensional image, a separate measurement must be performed for each pixel of the image. Most spectrophotometers can only make one measurement at a time, with the result that image generation is at best an incredibly slow process.

Spectrophotometers that are able to measure the spectral characteristics of many pixels of an image at once are available and are generally known as hyper-spectral imaging systems. However, these are very complex and expensive. They also require a reasonable amount of expertise to operate effectively, making them unsuitable for many commercial uses.

Methods of estimating reflectance spectra from images captured by conventional photographic equipment have also been explored. So-called multi-spectral imaging systems usually comprise conventional cameras equipped with multiple filters. Each filter only allows a limited range of wavelengths of light to pass. By capturing an image of an object through the different filters, spectral information about the object can be deduced. However, multi-spectral imaging systems are generally laborious to operate and can only record limited spectral information.

WO2003/030524 describes a method of estimating reflectance spectra from RGB signals of a digital camera. An RGB signal is converted to a spectrum using knowledge of the illumination spectrum and the sensitivity of the digital camera to different wavelengths of light. Weighting is applied to improve the smoothness and colour constancy of the spectrum to produce an estimated reflectance spectrum. In order for this method to be effective, the illumination spectrum must be known precisely. The camera therefore photographs objects in a closed box, inside which is a light source producing a known illumination spectrum. This is clearly impractical in many situations, such as when it is desired to photograph an object in situ. Furthermore, the sensitivity of the digital camera to different wavelengths of light is defined by three different sensitivity functions, broadly for red, green and blue light, with the levels of response of the camera for each sensitivity function making up values for each of the red, green and blue components of the RGB signal. Even with precise knowledge of the sensitivity functions, the RGB signal does not therefore allow complete reconstruction of the spectrum of light received by the camera. Rather, some information about the spectrum of light received by the camera is lost. So, despite the weighting to improve the smoothness and colour constancy of the estimated reflectance spectrum, the method inevitably produces only approximate reflectance spectra estimations.

The paper "Characterisation of natural illuminants in forests and the use of digital video data to reconstruct illuminant spectra", Chiao et al, Journal of the Optical Society of America, Vol. 17, No. 10, October 2000, shows that RGB signals of a digital camera can be mapped onto a family of known illuminant spectra. RGB signals representing the illuminant spectra are generated using the digital camera at the same time as the illuminant spectra are measured using a spectrophotometer. A linear transform is then derived between the RGB signals representing the illuminant spectra and the illuminant spectra as measured by the spectrophotometer using a least-squares procedure. Whilst this method obtains good results, it only applies to a closely related family of illuminant spectra. In order to apply the method to different illuminant spectra, RGB signals representing the different illuminant spectra must be generated using the digital camera and the different illuminant spectra must be measured using the spectrophotometer. Furthermore, the derived transform is specific to the particular digital camera used to generate the RGB signals. If it is desired to use RGB signals representing the illuminant spectra generated by a different camera, a new transform must be derived. In order for the new transform to be accurate, the illuminant spectra must be measured again using the spectrophotometer at the same time as the RGB signals representing the illuminant spectra are generated using the new digital camera. The method is therefore time consuming and impractical. This paper is also limited to the consideration of illuminant spectra, rather than the more complex problem of estimating reflectance spectra of objects.

WO2004/012442 describes a method of converting an image from RGB signals to CMYK ink dot quantities of a printer using estimated reflectance spectra. The reflectance spectra can be measured using a multi-spectral imaging device. Alternatively, in its fourth embodiment, WO2004/012442 describes estimating reflectance spectra from RGB signals using reference reflectance spectra stored in a database. An RGB signal representing a pixel of an image is converted into tristimulus values L*, a*, b* (which represent colours in a similar way to RGB signals but using a standard defined by the Commission Internationale d'Eclairage (CIE)) using knowledge of a model light source selected by a user. Likewise, tristimulus values L*, a*, b* are calculated for the reference reflectance spectra stored in the database. The reference reflectance spectrum in the database having tristimulus values L*, a*, b* closest to those of the pixel is then identified as the estimated reflectance spectrum of the pixel. In a fifth embodiment, it is suggested to allow users to select a category of reference reflectance spectra in the database, e.g. relating to flesh, flowers or such like, to narrow the comparison. This method may be effective in some circumstances. However, the comparison of tristimulus values L*, a*, b* to identify an appropriate reflectance spectrum can be inaccurate. In particular, different spectral sensitivities of different cameras that produce the RGB signals and differences between the actual illumination spectrum illuminating an object and the illumination spectrum of the model light source selected by the user can cause large inaccuracies in the calculated tristimulus values L*, a*, b*. The comparison is therefore likely frequently to identify an incorrect reflectance spectrum. So, likewise, the image conversion process can also be inaccurate.

The present invention seeks to overcome these problems.

SUMMARY OF THE INVENTION

According to a first aspect of the present invention there is provided method of generating a transform for adjusting a colour of an image, the colour being defined by intensity levels for plural different spectral distributions and the method comprising:

acquiring an input compensation transform for transforming the colour of the image into an input compensated spectrum;

estimating, using the acquired input compensation transform, simulated intensity levels for the plural different spectral distributions that best represent one or more reference reflectance spectra stored in a database of reference reflectance spectra; and generating the transform for adjusting the colour of the image from the simulated intensity levels.

According to a second aspect of the present invention, there is provided an apparatus for generating a transform for adjusting a colour of an image, the colour being defined by intensity levels for plural different spectral distributions and the apparatus comprising a processor for:

acquiring an input compensation transform for transforming the colour of the image into an input compensated spectrum;

estimating, using the acquired input compensation transform, simulated intensity levels for the plural different spectral distributions that best represent one or more reference reflectance spectra stored in a database of reference reflectance spectra; and generating the transform for adjusting the colour of the image from the simulated intensity levels.

So, the transform for adjusting the colour of the image can be based on simulated intensity levels for the plural different spectral distributions used to define the colour (or all colours) of the image that best represent one or more reference reflectance spectra. In other words, the input compensation transform can be used to estimate how the one or more reference reflectance spectra would be defined as (a) colour(s) of the image. The estimate can then form the basis for deriving the transform for adjusting an actual colour of the image.

The use of transforms is advantageous. The input compensation transform preferably maps the colour of the image, e.g. an RGB signal representing the colour, directly onto the input compensated spectrum, e.g. a function of light wavelength defining the colour independently of how the image is input. Similarly, the transform for adjusting the colour of the image preferably maps the colour of the image, e.g. an RGB signal representing the colour, directly onto an adjusted colour, which might be an estimated reflectance spectrum, e.g. a function of light wavelength defining the colour independently of how the image is input and modified using knowledge of the reference reflectance spectrum/a or the colour converted to a new colour space.

The method typically includes receiving the image. Likewise, the apparatus typically comprises a communications interface for receiving the image. The image may be received in an independent form, without any knowledge of a device that originally generated the image. However, the image is usually received from an image input device. The image input device typically generates the image. So, the method may comprise generating the image using an/the image input device. Similarly, the apparatus may incorporate an/the image input device for generating the image. The image input device might be virtually any sort of device for generating the image, including a scanner or multi-spectral imaging device. However, it is usually a digital camera.

The image usually comprises image data. The image or image data can be in a conventional format or standard that specifies the plural different spectral distributions, such as the Commission Internationale d'Eclairage (CIE) XYZ colour space. However, the spectral distributions are more likely to each represent the sensitivity of an/the image input device to different wavelengths of light. Expressed differently, the spectral distributions are typically functions of light wavelength.

The intensity levels generally specify a magnitude or amount of light for each spectral distribution. In particular, the intensity levels defining the colour of the image may each represent a level of response of an/the image input device for one of the spectral distributions. Similarly, the simulated intensity levels (for the one or more reference reflectance spectra) may each be an estimated level of response for an/the image input device (used to generate the image) for one of the spectral distributions.

The intensity levels may comprise levels of response of a multi-spectral imaging device. So, there might be several, e.g. more than five, different spectral distributions. As the number of spectral distributions increase, so does the amount spectral information that defines the colour of the image, and the transform for adjusting the colour of the image typically becomes more accurate. However, as mentioned above, the image input device is usually a digital camera or such like. So, the colour of the image is usually defined by a Red Green Blue (RGB) signal, as conventionally generated by most digital imaging devices. More generally, the colour of the image is usually defined by intensity levels for three different spectral distributions.

The input compensation transform can be acquired in a variety of ways. For example, the input compensation transform might be derived for an/the image input device. Acquiring the input compensation transform might comprise selecting the input compensation transform from a database of input compensation transforms. The selection might, for example, comprise identifying an/the image input device, e.g. camera, that generated the image and retrieving the input compensation transform for the identified image input device, e.g. from a database of input compensation transforms.

Typically, the input compensation transform is based on input compensation information. This information can take a variety of forms. In the above example, the input compensation information may comprise the sensitivity of an/the image input device to different wavelengths of light. However, information on the sensitivity of an image input device to different wavelengths of light is not always directly available. Furthermore, the input compensation information is preferably specific to the image itself, rather than just the image input device used to generate the image. This can allow it to include information relating to the illumination spectrum incident on an object of interest to which the image relates. So, the input compensation information preferably comprises an input compensation image generated by an/the image input device for an input compensation object. The input compensation object is typically an object for which one or more reflectance spectra are known. This could be any identifiable object. However, the input compensation object is preferably a known colour standard, such as a Macbeth colour chart.

Acquiring the input compensation transform may comprise deriving the input compensation transform from the input compensation information. In particular, acquiring the input compensation transform may comprise finding a non-negative least squares solution to an error function comparing spectra generated from the input compensation information (e.g. the input compensation image) using the input compensation transform to be acquired with (the) one or more known reflectance spectra (e.g. for the input compensation object).

This allows the input compensation transform to compensate for the plural different spectral distributions used to define the colour of the image and the illumination spectrum. However, it is known, for example, that the intensity levels generated by digital cameras and most other image input devices for the different spectral distributions that define the colour of the image tend not do not vary linearly with actual light intensity. So, it is useful also to compensate for the non-linearity of the intensity levels. The method may therefore comprise acquiring an intensity correction coefficient for correcting the intensity levels that define the colour of the image. Likewise, the processor may acquire an intensity correction coefficient for correcting the intensity levels that define the colour of the image. The intensity correction coefficient may be based on the input compensation information. More specifically, finding the non-negative least squares solution to the error function may include a non-linear optimisation to derive an intensity correction coefficient for correcting the intensity levels defining the colour of the image.

The database of reference reflectance spectra preferably stores reference object identification information defining reference objects to which the reference reflectance spectra relate. This reference object identification information can be category, sub-category and/or identity information defining categories, sub-categories and/or specific identities of reference objects to which the reference reflectance spectra relate. The method can comprise selecting one or more reference reflectance spectra for use in the estimation of the simulated intensity levels. Likewise, the processor allows selection of one or more reference reflectance spectra for use in the estimation of the simulated intensity levels. The selected spectrum/a typically relate to a reference object similar to a/the object of interest represented by the image. So, the selection can be based on (the) reference object identitification information stored in the database with the reference reflectance spectra. In general, the closer the reference object(s) to which the one or more reference reflectance spectra relate is/are in nature to the object of interest to which the image relates, the more useful is the generated transform for adjusting the colour of the image.

The estimation of the simulated intensity levels that best represent the one or more reference reflectance spectra can be achieved in a variety of ways. However, the simulated intensity level estimation preferably comprises finding a non-negative least squares solution to (an) appropriate error function(s). More specifically, the simulated intensity level estimation may comprise finding a non-negative least squares solution to an error function comparing spectra generated from the simulated intensity levels to be estimated using the acquired input compensation transform with the one or more (selected) reference reflectance spectra.

As mentioned above, the transform for adjusting the colour of the image may be a reflectance spectra estimation transform for transforming the colour of the image into an estimated reflectance spectrum. Indeed, generation of such a transform from an input compensation transform and one or more reference reflectance spectra is considered to be new when taken alone. So, according to a third aspect of the present invention, there is provided a method of generating a reflectance spectrum estimation transform for transforming a colour of an image into an estimated reflectance spectrum, the method comprising:

acquiring an input compensation transform for transforming the colour of the image into an input compensated spectrum; and generating the reflectance spectrum estimation transform from the acquired input compensation transform and one or more reference reflectance spectra stored in a database of reference reflectance spectra.

Also, according to a fourth aspect of the present invention, there is provided an apparatus for generating a reflectance spectrum estimation transform for transforming a colour of an image into an estimated reflectance spectrum, the apparatus comprising a processor for:

acquiring an input compensation transform for transforming the colour of the image into an input compensated spectrum; and generating the reflectance spectrum estimation transform from the acquired input compensation transform and one or more reference reflectance spectra stored in a database of reference reflectance spectra.

The reflectance spectrum estimation transform generation preferably comprises modifying the acquired input compensation transform using the one or more (selected) reference reflectance spectra. More specifically, the reflectance spectrum estimation transform generation may comprise finding a non-negative least squares solution to an error function comparing spectra generated from (the) simulated intensity levels (for different spectral distributions defining the colour of the image that best represent the one or more (selected) reference reflectance spectra) using the reflectance spectrum estimation transform to be generated with the one or more (selected) reference reflectance spectra. Use of a least squares method allows the derivation of a linear transform whilst avoiding the approximations and assumptions of other approaches, such as principle component analysis.

The generated reflectance spectrum estimation transform can be used to estimate a reflectance spectrum of an/the object of interest to which the image relates. So, according to a fifth aspect of the present invention, there is provided a method of estimating a reflectance spectrum comprising the method described above and transforming the colour of the image into an estimated reflectance spectrum using the derived reflectance spectrum estimation transform. Likewise, according to a sixth aspect of the present invention, there is provided an apparatus for estimating a reflectance spectrum comprising the apparatus described above, wherein the processor transforms the colour of the image into an estimated reflectance spectrum using the derived reflectance spectrum estimation transform.

Typically, the method comprises selecting a pixel of the image on which the reflectance spectrum estimation is to be based and transforming the colour of the selected pixel of the image into the estimated reflectance spectrum. Likewise, the processor may allow selection of a pixel of the image on which the reflectance spectrum estimation is to be based and transforms the colour of the selected pixel of the image into the estimated reflectance spectrum.

The reflectance spectrum estimation can also use an/the acquired intensity level compensation coefficient. So, the method preferably comprises transforming the colour of the image/pixel into an estimated reflectance spectrum using the generated reflectance spectrum estimation transform and an/the acquired intensity level compensation coefficient. Likewise, the processor preferably transforms the colour of the image/pixel into an estimated reflectance spectrum using the generated reflectance spectrum estimation transform and an/the acquired intensity level compensation coefficient.

As mentioned above, the transform for adjusting the colour of the image can alternatively be a colour space conversion transform for converting a colour of the image to a new colour space. Indeed, generation of such a transform from an input compensation transform and one or more reference reflectance spectra is considered to be new when taken alone.

So, according to a seventh aspect of the present invention, there is provided a method of generating a colour space conversion transform for converting a colour of an image to a new colour space, the method comprising:

acquiring an input compensation transform for transforming the colour of the image into an input compensated spectrum; and generating the colour space conversion transform from the acquired input compensation transform and one or more reference reflectance spectra in a database of reference reflectance spectra.

Likewise, according to an eighth aspect of the present invention, there is provided an apparatus for generating a colour space conversion transform for converting a colour of an image to a new colour space, the apparatus comprising a processor for:

acquiring an input compensation transform for transforming the colour of the image into an input compensated spectrum; and generating the colour space conversion transform from the acquired input compensation transform and one or more reference reflectance spectra in a database of reference reflectance spectra.

A colour space is typically defined by plural different spectral distributions. Intensity levels for each of the different spectral distributions define a colour in the colour space. So, the colour of the image is generally defined in a given colour space, e.g. RGB colour space, and the colour space conversion transform can map the colour of the image to the new colour space, e.g. defined by another plurality of different spectral distributions, such as CIE XYZ colour space.

The colour space conversion transform generation typically comprises estimating intensity levels for plural different spectral distributions defining colours in the new colour space that best represent the (selected) one or more reference reflectance spectra. This is typically achieved using information about the different spectral distributions of the new colour space. This information might be a spectral sensitivity transform, e.g. so-called colour matching functions, or such like. The colour space conversion transform can then be generated from (the) simulated intensity levels (for different spectral distributions defining the colour of the image that best represent the one or more (selected) reference reflectance spectra) and the intensity levels estimated for the plural different spectral distributions of the new colour space.

The generated colour space conversion transform can of course be used to convert the colour of the image from one colour space to another. So, according to a ninth aspect of the present invention, there is provided a method of converting a colour of an image to a new colour space comprising the method described above and converting the colour of the image to the new colour space using the generated colour space conversion transform. Likewise, according to a tenth aspect of the present invention, there is provided an apparatus for converting a colour of an image to a new colour space comprising the apparatus described above, wherein the processor converts the colour of the image to the new colour space using the generated colour space conversion transform.

The invention can be implemented exclusively by computer software running on appropriate processing means. So, the invention specifically extends to computer software for carrying out the method described above. The computer software or computer program code can be carried by a computer readable medium. The medium may be a physical storage medium, such as a Read Only Memory (ROM) chip. Alternatively, it may be a disk such as a Compact Disc Read Only Memory (CD-ROM) or Digital Versatile Disc Read Only Memory (DVD-ROM) or any other suitable computer readable medium. It could also be a signal such as an electronic signal over wires, an optical signal or a radio signal such as to a satellite or such like. The invention also extends to a processor running the software or code, e.g. a computer configured to carry out the method described above.

Likewise, use of the terms "communications interface" and "processor" above is intended to be general rather than specific. The invention is preferably implemented using a personal computer. Indeed, the invention specifically extends to a computer incorporating the processor mentioned above. However, the invention is not limited to this. For example, the invention can be implemented in dedicated hardware. So whilst the processor could be a digital signal processor (DSP) or central processing unit (CPU) for example, it could equally well be implemented using other components, including a circuit. Such a circuit could be fabricated in any appropriate way. It might comprise an application specific integrated circuit (ASIC) or a composite metal oxide semiconductor (CMOS) circuit for example. Similarly, while the communication interface might be an interface between different devices, such as the personal computer and camera, it may equally well be an internal component of the apparatus, such as a bus for retrieving image from a memory.

Preferred embodiments of the invention will now be described, by way of example only, with reference to the accompanying drawings.

DETAILED DESCRIPTION OF THE PREFERRED EMBODIMENTS

Figure 1:
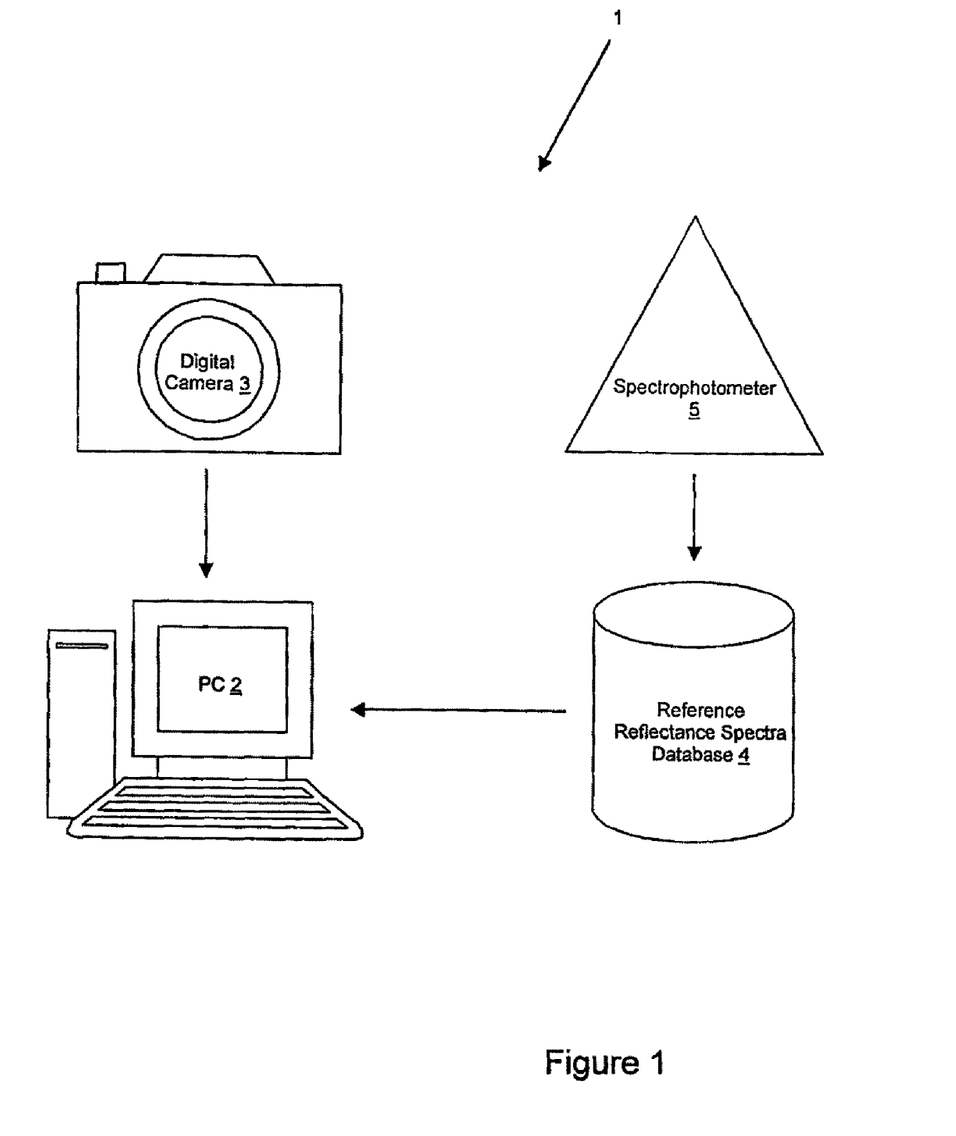
FIG. 1 is a schematic illustration of an apparatus for generating a transform for adjusting a colour of an image.

Referring to FIG. 1, an apparatus 1 for generating a transform for adjusting a colour of an image comprises a personal computer (PC) 2 that runs software for implementing the invention. The software can be coded in a variety of different computer programming languages, such as Matlab™, Java™ or Python™. It can be provided to the PC 2 on a disc, such as a Compact Disc Read Only Memory (CD-ROM) or Digital Versatile Disc (DVD), or downloaded via the Internet or such like. The PC 2 has a processor (not shown) for processing the software code and hence allowing the PC 2 to run the software for implementing the invention.

The PC 2 receives an image output from a digital camera 3. The digital camera 3 is conventional and not therefore described in detail. The image it outputs is made up of a plurality of pixels. The camera 3 has three types of detector (not shown) for capturing each pixel of the image, broadly one for red light, one for green light and one for blue light. Each pixel is defined by a level of response of each one of these different types of detectors or a so-called Red Green Blue (RGB) signal. The RGB signals can be referred to as defining the pixels of the image in a "colour space", as described in more detail below. In this embodiment, the image is output as image data encoded using a conventional image file format, such as the Joint Photographic Experts Group (JPEG) format or the Graphic Interchange Format (GIF). The image can be output from the camera 3 to the PC 2 using a conventional interface, such as a Universal Serial Bus (USB) connection or such like.

A reference reflectance spectra database 4 can be accessed by the PC 2. The reference reflectance spectra database 4 contains reference reflectance spectra, each of which is a known reflectance spectrum for a given reference object. The reference reflectance spectra are stored in the database 4 with an indication of the reference object to which they relate. In this embodiment, the reference reflectance spectra database 4 is arranged hierarchically. So, the reference object to which each reference reflectance spectrum relates can have a category, one or more sub categories and a specific identity. The reference reflectance spectra can be retrieved by the PC 2 from the database 4 by selecting an appropriate object category, sub-category or specific identity. For example, a reference reflectance spectrum representing autumnal oak leaves might have the category "leaves", sub-categories "autumnal leaves" and "oak leaves" and identity "autumnal oak leaves". The reference reflectance spectrum can be retrieved from the database 4 by selecting the specific identity "autumnal oak leaves". Alternatively, selecting the category "leaves" or sub-categories "autumnal leaves" or "oak leaves" retrieves the reference reflectance spectrum for autumnal oak leaves, along with any other reference reflectance spectra for reference objects having the same category or sub-category. So, depending upon how precisely a reference object is identified, one or more reference reflectance spectra can be retrieved from the database 4.

In this embodiment, the reference reflectance spectra database 4 is compiled and held centrally. So, the database 4 is held on a server accessible to the PC 2 over the internet. A spectrophotometer 5 is used by the organisation that administers the database 4 to measure reflectance spectra for sample objects. These measured reflectance spectra are added to the database 4 as reference reflectance spectra. However, in other embodiments, the database 4 is compiled and held in a distributed form. In particular, the database 4 can be stored by the PC 2. So, like the software for implementing the invention, the database 4 can be provided to the PC 2 on a disc, such as a Compact Disc Read Only Memory (CD-ROM) or Digital Versatile Disc (DVD), or downloaded via the Internet or such like. The spectrophotometer 5 can then be that of an individual user, who can measure their own reflectance spectra and add them to the database 4 as reference reflectance spectra. Similarly, the database 4 can incorporate reference reflectance spectra obtained from sources other than directly from the spectrophotometer 5, such as reflectance spectra in other databases, e.g. the Standard Object Colour Spectra Database for Colour Reproduction Evaluation (SOCS) (ISO/TR 16066:2003) of the International Organisation for Standardisation (ISO).

The PC 2 uses the reference reflectance spectra in the database 4 to adjust a colour of the image received from the digital camera 3. In order to allow a user to manage this process, the PC 2 generates a Graphical User Interface (GUI) 6. The GUI 6 is displayed on a monitor of the PC 2 and a user can interact with it using a computer mouse and keyboard (not shown) of the PC 2.

Figure 2:
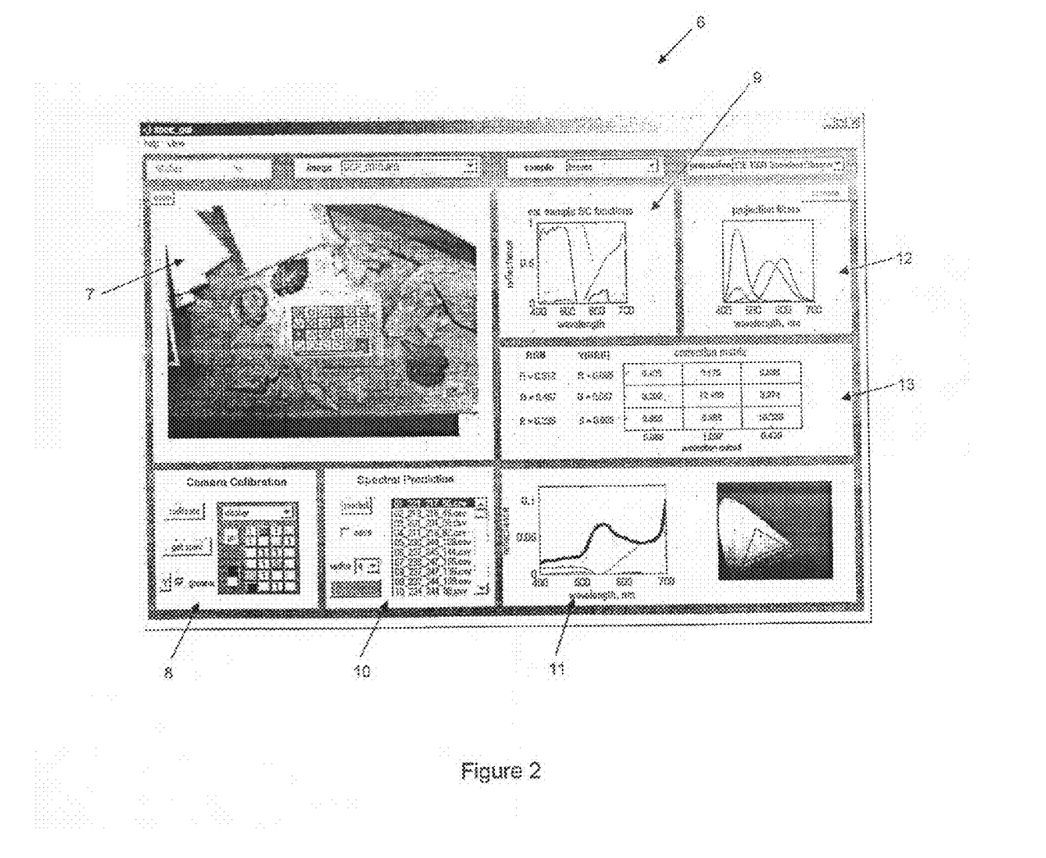
FIG. 2 is an illustration of a graphical user interface of a personal computer of the apparatus of FIG. 1.

Referring to FIG. 2, the GUI 6 displays the image received from the camera 3 in an image display area 7. A camera calibration display area 8 displays information relating to an image input compensation process, as described below. In this embodiment, the adjustment process performed by the PC 2 results in the display and storage of an estimated reflectance spectrum and the display and storage of the colour of the image converted to a new colour space. In order to estimate the reflectance spectrum, a reflectance spectrum estimation transform is generated by the PC1. This transform is displayed graphically in reflectance spectrum estimation transform display area 9 of the GUI 6 as three modified spectral component functions, one for each of the red, green and blue components of the RGB signal defining the colour of the image. Information concerning the colour of a pixel of the image for which a reflectance spectrum is to be estimated is displayed in spectral prediction display area 10 of the GUI 6 and the reflectance spectrum estimated using the reflectance spectrum estimation transform is shown both graphically and in a chromaticity diagram in reflectance spectrum display area 11. In order to convert the colour of the image to the new colour space, a colour space conversion transform is generated by the PC 2. A spectral sensitivity transform defining the new colour space is displayed graphically as projection filters in new colour space display area 12. The colour space conversion transform, generated using the spectral sensitivity transform is displayed as a matrix in new colour space display area 13, along with the values of the RGB signal for the colour of the image to be converted and the converted values in the new colour space.

Image Input Compensation

In order to estimate a reflectance spectrum or to convert the colour of the image from one colour space into another, an image input compensation process is first performed. The image input compensation process compensates for the sensitivity of the camera 3 used to generate the image to different wavelengths of light and the illumination spectrum incident on an object of interest to which the image relates. It is achieved by deriving an input compensation transform based on an input compensation image, which is an image of a known colour standard, such as a Macbeth colour chart. In this example, the image of the Macbeth colour chart is included in the image received from the camera 3 and referred to above.

The input compensation transform $X_C$ comprises a spectral component function for each of the red, green or blue components of the RGB signal defining the colour of the image. Each spectral component function defines an estimation of the spectrum of light represented by one of the red, green or blue components of the RGB signal. In this embodiment, the input compensation transform $X_C$ comprises a 3×N matrix, where N is a number of wavelength bins across the visible spectrum of light and each of the three rows relates to one of the red, green or blue components of the RGB signals (or one of the spectral component functions). A gamma correction function $f_{\gamma_C}$ is also used to correct for a non-linear response of the camera 3 to different light intensities. In this embodiment, the gamma correction function $f_{\gamma_C}$ is a power function with a respective gamma coefficient $\gamma_C$ for each of the red, green or blue components of the RGB signals of the image defining the exponent of the power function.

The input compensation transform $X_C$ is specific to the image from which it is generated, e.g. the image that includes the image of the Macbeth colour chart. However, as only the illumination spectrum usually changes between different images captured by the same camera 3 and the sensitivity of the camera 3 remains constant, an input compensation transform $X_C$ generated from any image generated by the camera 3 can be used for other images generated by the same camera 3, albeit with reduced accuracy. This can be useful when it is inconvenient to include the Macbeth colour chart in an image and generate a new input compensation transform for the image. So, to avoid ambiguity, the image input compensation process is presented to the user as calibration of the camera 3 in the GUI 6 and the user is presented with the option of whether or not to perform the camera calibration/image input compensation process for a particular image.

Figure 3:
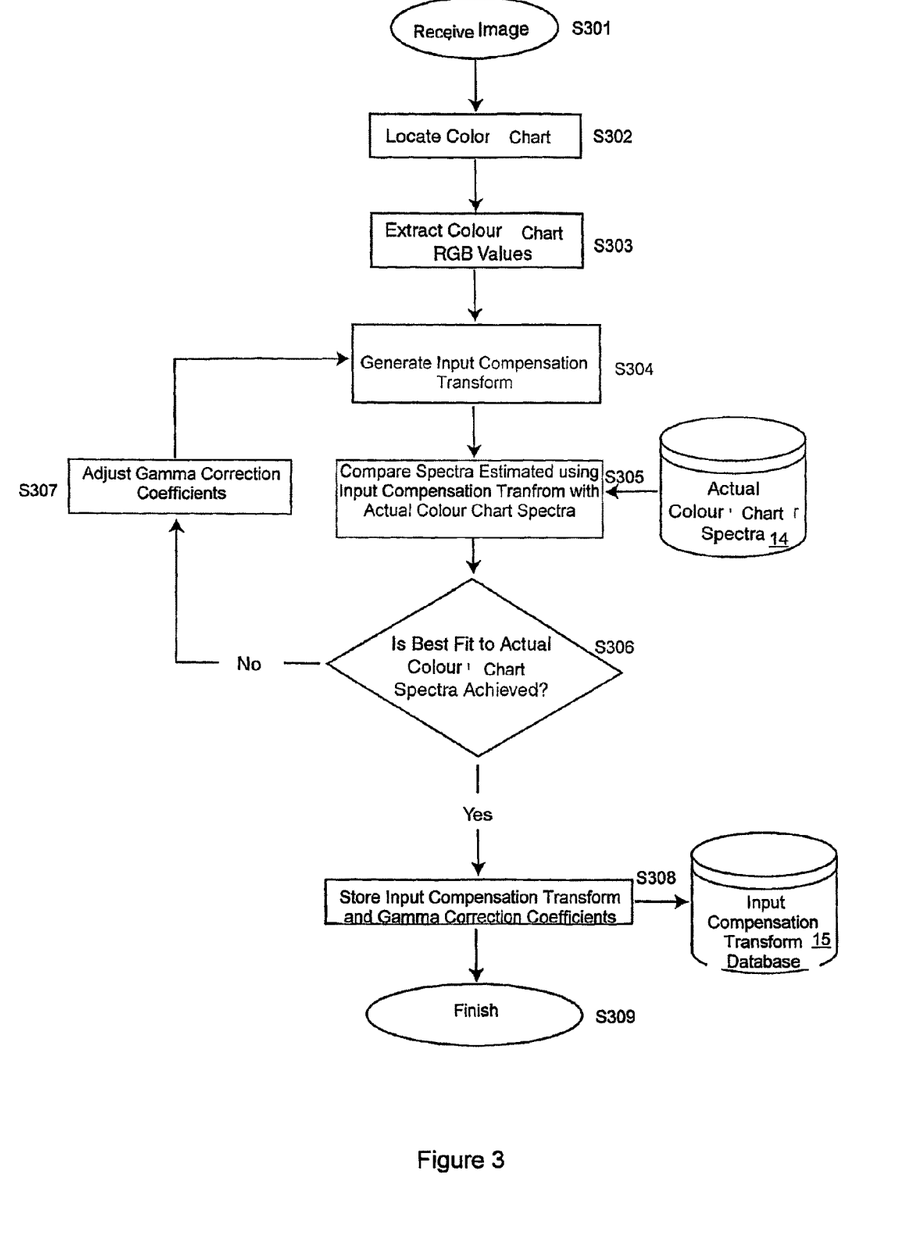
FIG. 3 is a flowchart illustrating a method of generating an input compensation transform for an image generated by a digital camera of the apparatus of FIG. 1.

Looking at the image input compensation process in more detail, referring to FIG. 3, in step S301 the PC 2 receives the image from the camera 3. The next step, S302, is to locate the Macbeth colour chart in the image. The PC 2 prompts the user, via the GUI 6, to select the image of the Macbeth colour chart in the image displayed in the image display area 7 using the mouse of the PC 2. The PC 2 then extracts, in step S303, the RGB signal values of the pixels of the image that relate to each of the colours on the Macbeth colour chart. It is likely that each colour of the Macbeth colour chart will be represented by many pixels of image. So, the average RGB signal for the pixels representing each colour of the Macbeth colour chart is calculated. As the Macbeth colour chart has 24 different colours, the RGB signal values for the Macbeth colour chart can be represented by a 24×3 matrix $R_C$.

At step S304, the input compensation transform $X_C$ is generated with gamma correction coefficients $\gamma_C$ set at unity. At step S305, the generated input compensation transform $X_C$ and gamma correction coefficients $\gamma_C$ are used to estimate the reflectance spectra $\hat{S}_C$ of the colours of the Macbeth colour chart from the RGB signal values $R_C$ of the image. The estimated reflectance spectra $\hat{S}_C$ are then compared with known reflectance spectra $S_C$ of the colours of the Macbeth colour chart. In this embodiment, both the estimated reflectance spectra $\hat{S}_C$ and the known reflectance spectra $S_C$ comprise 24×N matrices, where N is the number of wavelength bins across the visible spectrum of light and each of the 24 rows represents a colour of the Macbeth colour chart. The known reflectance spectra $S_C$ are retrieved from a memory 14 of the PC 2, which in this embodiment is a data file stored on a hard drive of the PC 2, but can alternatively be a database accessible by the PC 2 over the Internet or such like. At step S306, it is determined whether or not the estimated reflectance spectra $\hat{S}_C$ are the closest possible to the known reflectance spectra $S_C$. If not, the gamma correction coefficients $\gamma_C$ are adjusted at step S307, a new input compensation transform $X_C$ is generated at step S304 and new estimated reflectance spectra $\hat{S}_C$ are calculated at step S305. When the estimated reflectance spectra $\hat{S}_C$ are the closest possible to the known reflectance spectra $S_C$, the input compensation transform $X_C$ and gamma correction coefficients $\gamma_C$ are stored, at step 308, in an input compensation transform database 15. Again, in this embodiment, the input compensation transform database 15 comprises a data file stored on the hard drive of the PC 2, but can alternatively be a database accessible by the PC 2 over the Internet or such like. At step S309, generation of the input compensation transform $X_C$ and the image input compensation process are complete.

In this embodiment, steps S304 to S307 are implemented by minimising an error function $$\langle |f_{\gamma_C}(R_C,\gamma_C) \cdot X_C - S_C|^2 \rangle \qquad (1)$$

with respect to input compensation transform $X_C$ by combining non-negative least squares, with an unconstrained linear optimisation with respect to gamma correction coefficients $\gamma_C$ and where brackets $\langle\rangle$ indicate an ensemble average.

Estimation of a Reflectance Spectrum

The derived input compensation transform $X_C$ could be used to estimate the reflectance spectrum of an object of interest in the image. However, the spectral component functions of the input compensation transform $X_C$ are optimised for the colours of the Macbeth colour chart. So, the next step is to modify the spectral component functions of the input compensation transform $X_C$ to take account of the reflectance spectrum of the object of interest to which the image relates to derive a reflectance spectrum estimation transform $X_S$. However, the reflectance spectrum of the object of interest is not known directly. So, the reflectance spectra estimation transform $X_S$ is derived using the reference reflectance spectra in the reference reflectance spectra database 4.

Figure 4:
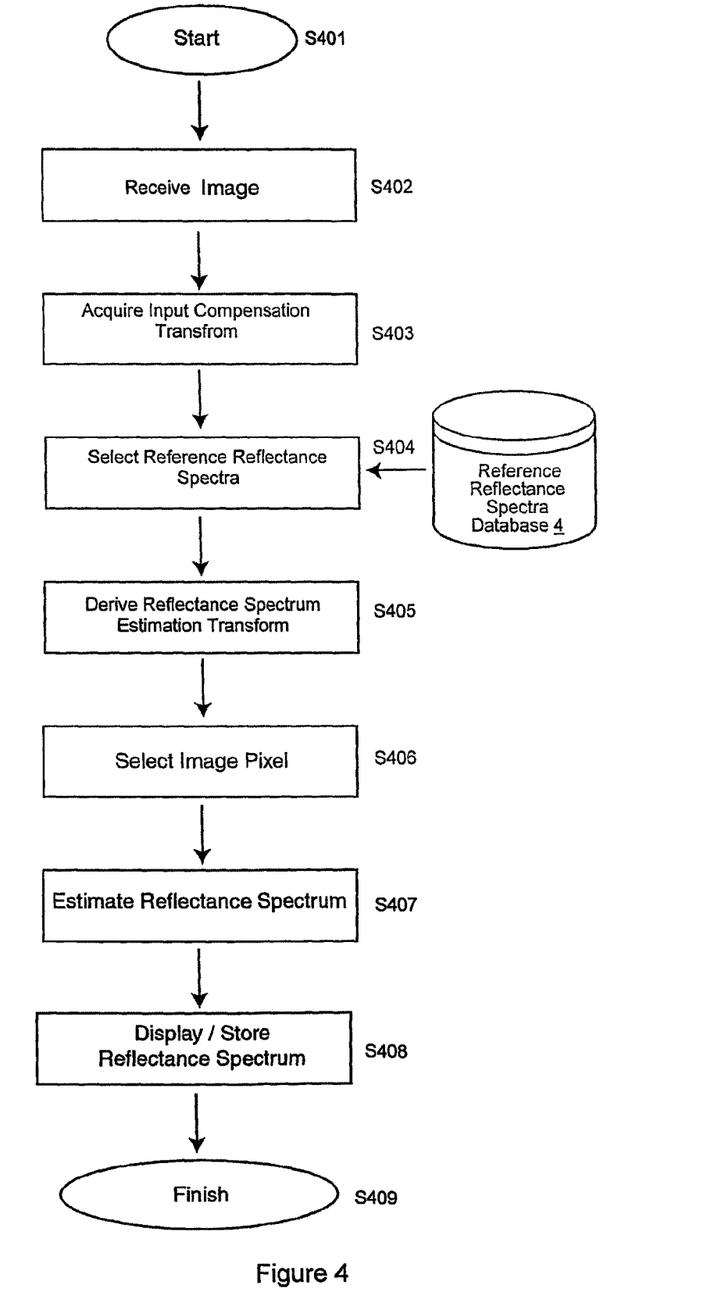
FIG. 4 is a flowchart illustrating a method of estimating a reflectance spectrum.

In more detail, referring to FIG. 4, this process starts at step S401 and, at step S402, the image is received from the camera 3. In this embodiment, the received image is the same as that used during derivation of the input compensation transform $X_C$. In other words, the image comprises an image of both the Macbeth colour chart and the object of interest. However, the invention is not limited to this and the input compensation transform $X_C$ can be derived from a separate image or acquired using other methods. So, at step S403 the input compensation transform $X_C$ derived using the input compensation process described above with reference to FIG. 3 or another suitable input compensation transform $X_C$ is retrieved from the input compensation transform database 15.

At step S404, the PC 2 prompts the user via the GUI 6 to select reference reflectance spectra $S_S$ from the reference reflectance spectra database 4 for use in deriving the reflectance spectrum estimation transform $X_S$. As described above, each reference reflectance spectrum is stored in the database 4 with an object category, sub-category and/or object specific identity, e.g. leaves, autumnal leaves, oak leaves and/or autumnal oak leaves etc. The user selects the category, sub-category and/or specific identity that most closely matches the object of interest in the image via the GUI 6.

At step S405, the reflectance spectrum estimation transform $X_S$ is derived using the selected reference reflectance spectra $S_S$. First, simulated levels of response $R_S$ for the camera 3 (and the incident illumination spectrum) that best represent the selected reference reflectance spectra $S_S$ are estimated using the input compensation transform $X_C$. More specifically, an error function $$\langle |X_C{}^T \cdot R_S{}^T - S_S{}^T|^2 \rangle \quad (2)$$

is minimised with respect to the simulated levels of response $R_S$ using non-negative least squares where brackets $\langle\rangle$ indicate an ensemble average and T represents the transpose of the matrices. The simulated levels of response $R_S$ are then used to derive the reflectance spectra estimation transform $X_S$. Again, more specifically, an error function $$\langle |R_S \cdot X_S - S_S|^2 \rangle \quad (3)$$

is minimised with respect to the reflectance spectra estimation transform $X_S$, again using non-negative least squares where brackets $\langle\rangle$ indicate an ensemble average. The reflectance spectrum estimation transform $X_S$ comprises a modified spectral component function for each of the red, green and blue signal components of the RGB signal.

At step S406 a user can select a pixel of the image for which it is desired to estimate a reflectance spectrum. The RGB signal values $R_m$ of the pixel are retrieved from the image and, at step S407, an estimated reflectance spectrum $S_m$ is generated for the pixel from the RGB values $R_m$ of the pixel, the derived reflectance spectra estimation transform $X_S$ and the intensity correction function $f_{\gamma_C}$. More specifically, an equation $$S_m = f_{\gamma_C}(R_m) \cdot X_s \quad (4)$$

is used to find the estimated reflectance spectrum $S_m$. At step S408, the estimated reflectance spectrum $S_m$ for the pixel is displayed both graphically and in the chromaticity diagram in reflectance spectrum display area 11 of the GUI 6. It is also stored in a memory of the PC 2. The process finishes at step S409.

Conversion to New Colour Space

The colour of the image received from the camera 3 can also be converted to a new colour space. This is achieved by generating a colour space conversion transform P for converting the colour of the image to the new colour space. In this embodiment, the colour of the image is converted from RGB colour space to Commission Internationale d'Eclairage CIE XYZ colour space. The RGB colour space is defined by a combination of the sensitivity of the camera 3 to different wavelengths of light and the illumination spectrum incident on the object of interest to which the image relates. The CIE XYZ colour space is defined by the spectral distributions of the CIE XYZ standard.

Figure 5:
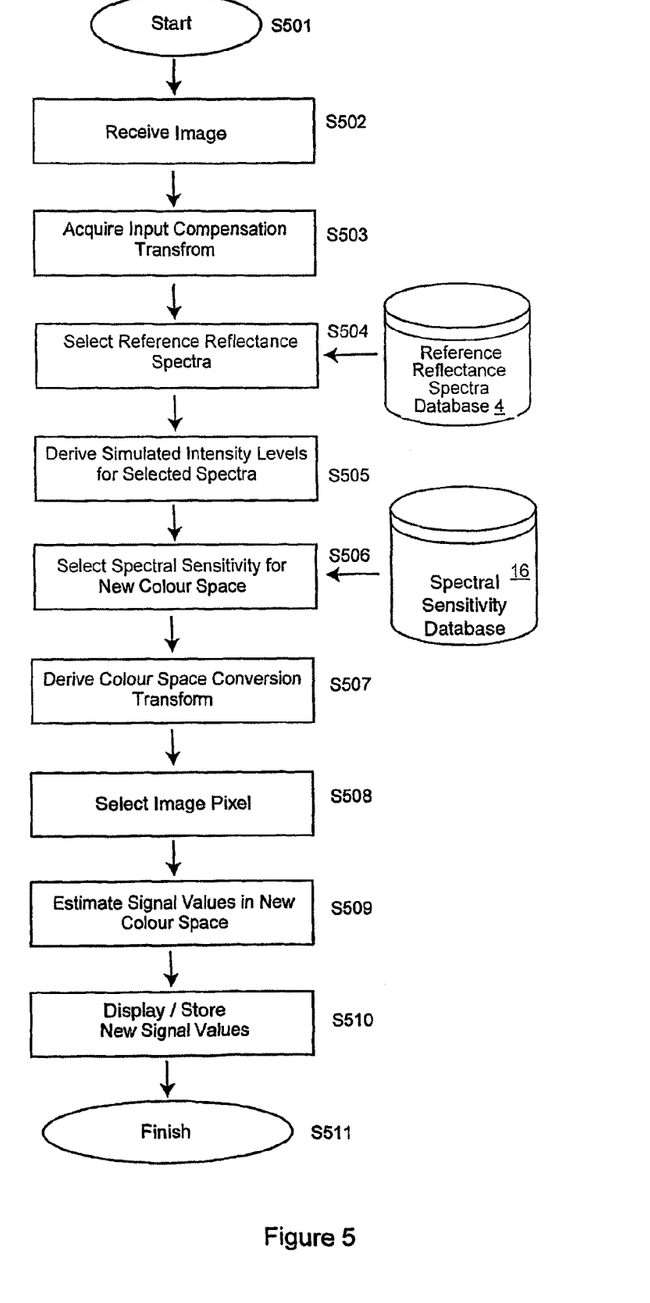
FIG. 5 is a flowchart illustrating a method of converting the colour of the image to a new colour space.

In more detail, referring to FIG. 5, a colour conversion process starts at step S501 and, at step S502, the image is received from the camera 3. In this embodiment, the received image is the same as that used during generation of the input compensation transform $X_C$. In other words, the image comprises an image of both the Macbeth colour chart and the object of interest. However, the process is not limited to this and the input compensation transform $X_C$ can be derived from a separate image or acquired using other methods. So, at step S503, the input compensation transform $X_C$ derived using the input compensation process described above with reference to FIG. 3 or another suitable input compensation transform $X_C$ is retrieved from the input compensation transform database 15.

At step S504, the PC 2 prompts the user via the GUI 6 to select reference reflectance spectra $S_S$ from the reference reflectance spectra database 4 for use in generating the colour space conversion transform P. As described above, each reference reflectance spectrum is stored with an object category, sub-category and/or object identifier, e.g. leaves, autumnal leaves, oak leaves and/or autumnal oak leaves etc. The user selects the category, sub-category and/or object identifier that most closely matches the object of interest in the image via the GUI 6.

At step S505, simulated levels of response $R_S$ for the camera 3 that best represent the selected reflectance spectra $S_S$ are estimated using the input compensation transform $X_C$, similarly to the reflectance spectrum estimation process described above with reference to FIG. 4. In other words, the error function (2) above is minimised with respect to the simulated levels of response $R_S$ using non-negative least squares. At step S506, a CIE XYZ spectral sensitivity transform $X_{XYZ}$ that transforms intensity levels in CIE XYZ space to full spectral information is retrieved from spectral sensitivity database 16. In this embodiment, the spectral sensitivity database 16 is a data file stored on a hard drive of the PC 2, but can alternatively be a database accessible by the PC 2 over the Internet or such like. The transform $X_{XYZ}$ is defined by the CIE XYZ standard and is often referred to as a colour matching function. Here, the spectral sensitivity transform $X_{XYZ}$ is used to derive intensity levels $R_{XYZ}$ that best represent the selected reference reflectance spectra $S_S$ in the new colour space. In other words, equation $$R_{XYZ} = S_X \cdot X_{XYZ} \quad (5)$$

is used to derive the intensity levels $R_{XYZ}$ in the new colour space.

So, the intensity levels $R_S$, $R_{XYZ}$ that best represent the selected reflectance spectra $S_S$ in the RGB colour space and the CIE XYZ colour space have now been estimated and derived. The colour space conversion transform P can then be generated relatively straightforwardly from these intensity levels $R_S$, $R_{XYZ}$, by calculating a mapping between the intensity levels $R_S$, $R_{XYZ}$. More specifically, equation $$R_{XYZ} = R_S \cdot P \quad (6)$$

is solved by inversion to find the colour space conversion transform P, which is in the form of a 3×3 matrix, for converting the RGB values $R_S$ directly to the desired CIE XYZ space values $R_{XYZ}$.

The described embodiments of the invention are only examples of how the invention may be implemented. Modifications, variations and changes to the described embodiments will occur to those having appropriate skills and knowledge. These modifications, variations and changes may be made without departure from the spirit and scope of the invention defined in the claims and its equivalents.

The invention claimed is:

1. A computer-implemented method of generating a transform for adjusting a colour of an image using a processor, the colour being defined by intensity levels for plural different spectral distributions and the method comprising:
the processor acquiring an input compensation transform for transforming the colour of the image into an input compensated spectrum;
the processor estimating, using the acquired input compensation transform, simulated intensity levels for the plural different spectral distributions that best represent one or more reference reflectance spectra stored in a database of reference reflectance spectra; and
the processor generating the transform for adjusting the colour of the image from the simulated intensity levels.

2. The computer-implemented method of claim 1, comprising receiving the image from an image input device.

3. The computer-implemented method of claim 1, comprising generating the image using an image input device.

4. The computer-implemented method of claim 3, wherein the image input device is a digital camera.

5. The computer-implemented method of claim 1, wherein the spectral distributions each represent sensitivity of an/the image input device to different wavelengths of light.

6. The computer-implemented method of claim 1, wherein the intensity levels defining the colour of the image are each a level of response of an image input device for one of the spectral distributions.

7. The computer-implemented method of claim 1, wherein the simulated intensity levels are each an estimated level of response of an image input device for one of the spectral distributions.

8. The computer-implemented method of claim 1, wherein the colour of the image is defined by an RGB signal.

9. The computer-implemented method of claim 1, wherein the acquired input compensation transform is based on input compensation information.

10. The computer-implemented method of claim 9, wherein the input compensation information comprises an input compensation image generated by an image input device for an input compensation object.

11. The computer-implemented method of claim 10, wherein the input compensation object is an object for which one or more reflectance spectra are known.

12. The computer-implemented method of claim 10, wherein the input compensation object is a known colour standard.

13. The computer-implemented method of claim 10, wherein the input compensation object is a Macbeth colour chart.

14. The computer-implemented method of claim 1, wherein acquiring the input compensation transform comprises finding a non-negative least squares solution to an error function comparing spectra generated from input compensation information using the input compensation transform to be acquired with one or more known reflectance spectra.

15. The computer-implemented method of claim 1, further comprising acquiring an intensity correction coefficient for correcting the intensity levels defining the colour of the image.

16. The computer-implemented method of claim 15, wherein the intensity correction coefficient is based on input compensation information.

17. The computer-implemented method of claim 14, wherein finding the non-negative least squares solution to the error function includes a non-linear optimisation to acquire an intensity correction coefficient for correcting the intensity levels defining the colour of the image.

18. The computer-implemented method of claim 1, wherein the database of reference reflectance spectra stores reference object identification information defining reference objects to which the reference reflectance spectra stored in the database relate.

19. The computer-implemented method of claim 18, wherein the identification information comprises object category, sub-category and/or specific identity information defining categories, sub-categories and/or specific identities of the reference objects to which the reference reflectance spectra stored in the database relate.

20. The computer-implemented method of claim 1, wherein the method comprises selecting the one or more reference reflectance spectra for use in the estimation of the simulated intensity levels.

21. The computer-implemented method of claim 20, wherein the selection is based on reference object identification information stored in the database with the reference reflectance spectra.

22. The computer-implemented method of claim 1, wherein the one or more reference reflectance spectra relate to a reference object similar to an object of interest to which the colour of the image relates.

23. The computer-implemented method of claim 1, wherein the simulated intensity level estimation comprises finding a non-negative least squares solution to an error function comparing spectra generated from the simulated intensity levels to be estimated using the acquired input compensation transform with the one or more reference reflectance spectra.

24. The computer-implemented method of claim 1, wherein the transform for adjusting the colour of the image comprises a reflectance spectra estimation transform for transforming the colour of the image into an estimated reflectance spectrum.

25. A computer-implemented method of generating a reflectance spectrum estimation transform for transforming a colour of an image into an estimated reflectance spectrum using a processor, the method comprising:
the processor acquiring an input compensation transform for transforming the colour of the image into an input compensated spectrum; and
the processor generating the reflectance spectrum estimation transform from the acquired input compensation transform and one or more reference reflectance spectra stored in a database of reference reflectance spectra.

26. The computer-implemented method of claim 25, wherein the reflectance spectrum estimation transform generation comprises modifying the acquired input compensation transform using the one or more reference reflectance spectra.

27. The computer-implemented method of claim 25, wherein the reflectance spectrum estimation transform generation comprises finding a non-negative least squares solution to an error function comparing spectra generated from simulated intensity levels for different spectral distributions defining the colour of the image that best represent the one or more reference reflectance spectra using the reflectance spectrum estimation transform to be generated with the one or more reference reflectance spectra.

28. A computer-implemented method of estimating a reflectance spectrum comprising the method of claim 25, and transforming the colour of the image into an estimated reflectance spectrum using the acquired reflectance spectra estimation transform.

29. The computer-implemented method of claim 28, comprising selecting a pixel of the image on which the reflectance spectrum estimation is to be based and transforming the colour of the selected pixel into the estimated reflectance spectrum.

30. The computer-implemented method of claim 28, comprising transforming the colour of the image/pixel into the estimated reflectance spectrum using the generated reflectance spectrum estimation transform and an/the acquired intensity level compensation coefficient.

31. The computer-implemented method of claim 1, wherein the transform for adjusting the colour of the image is a colour space conversion transform for converting the colour of the image to a new colour space.

32. A computer-implemented method of generating a colour space conversion transform for converting a colour of an image to a new colour space using a processor, the method comprising:
acquiring, using the processor, an input compensation transform for transforming the colour of the image into an input compensated spectrum; and
generating, using the processor, the colour space conversion transform from the acquired input compensation transform and one or more reference reflectance spectra in a database of reference reflectance spectra.

33. The computer-implemented method of claim 32, wherein the colour space conversion transform generation comprises estimating intensity levels for plural different spectral distributions defining colours in the new colour space that best represent the one or more reference reflectance spectra.

34. The computer-implemented method of claim 33, wherein the colour space conversion transform generation comprises generating the transform from simulated intensity levels for different spectral distributions defining the colour of the image that best represent the one or more reference reflectance spectra and the intensity levels estimated for the plural different spectral distributions of the new colour space.

35. A computer-implemented method of converting a colour of an image to a new colour space comprising the method of claim 32, and converting the colour of the image to the new colour space using the generated colour space conversion transform.

36. An apparatus for generating a transform for adjusting a colour of an image, the colour being defined by intensity levels for plural different spectral distributions and the apparatus comprising a processor for:
acquiring an input compensation transform for transforming the colour of the image into an input compensated spectrum;
estimating, using the acquired input compensation transform, simulated intensity levels for the plural different spectral distributions that best represent one or more reference reflectance spectra stored in a database of reference reflectance spectra; and
generating the transform for adjusting the colour of the image from the simulated intensity levels.

37. The apparatus of claim 36, comprising a communications interface for receiving the image from an image input device.

38. The apparatus of claim 36, incorporating an image input device for generating the image.

39. The apparatus of claim 38, wherein the image input device is a digital camera.

40. The apparatus of claim 36, wherein the spectral distributions each represent sensitivity of an/the image input device to different wavelengths of light.

41. The apparatus of claim 36, wherein the intensity levels defining the colour of the image are each a level of response of an image input device for one of the spectral distributions.

42. The apparatus of claim 36, wherein the simulated intensity levels are each an estimated level of response of an image input device for one of the spectral distributions.

43. The apparatus of claim 36, wherein the image comprises an RGB signal.

44. The apparatus of claim 36, wherein the acquired input compensation transform is based on input compensation information.

45. The apparatus of claim 44, wherein the input compensation information comprises an input compensation image generated by an image input device for an input compensation object.

46. The apparatus of claim 45, wherein the input compensation object is an object for which one or more reflectance spectra are known.

47. The apparatus claim 45, wherein the input compensation object is a known colour standard.

48. The apparatus of claim 45, wherein the input compensation object is a Macbeth colour chart.

49. The apparatus of claim 36, wherein the processor acquires the input compensation transform by finding a non-negative least squares solution to an error function comparing spectra generated from input compensation information using the input compensation transform to be acquired with one or more known reflectance spectra.

50. The apparatus of claim 36, wherein the processor acquires an intensity correction coefficient for correcting the intensity levels defining the colour of the image.

51. The apparatus of claim 50, wherein the intensity correction coefficient is based on input compensation information.

52. The apparatus of claim 49, wherein the processor finds the non-negative least squares solution to the error function by using a non-linear optimisation to acquire an intensity correction coefficient for correcting the intensity levels defining the colour of the image.

53. The apparatus of claim 36, wherein the database of reference reflectance spectra stores reference object identification information defining reference objects to which the reference reflectance spectra stored in the database relate.

54. The apparatus of claim 53, wherein the identification information comprises object category, sub-category and/or specific identity information defining categories, sub-categories and/or specific identities of reference objects to which the reference reflectance spectra stored in the database relate.

55. The apparatus of claim 36, wherein the processor allows selection of the one or more reference reflectance spectra for use in the estimation of the intensity levels from the database of reference reflectance spectra.

56. The apparatus of claim 55, wherein the selection is based on reference object identification information stored in the database with the reference reflectance spectra.

57. The apparatus of claim 36, wherein the reference reflectance spectra relate to a reference object similar to an object of interest to which the image relates.

58. The apparatus of claim 36, wherein the processor estimates the simulated intensity levels by finding a non-negative least squares solution to an error function comparing spectra generated from the simulated intensity levels to be estimated using the acquired input compensation transform with the one or more reference reflectance spectra.

59. The apparatus of claim 36, wherein the transform for adjusting the colour of the image comprises a reflectance spectra estimation transform for transforming the colour of the image into an estimated reflectance spectrum.

60. An apparatus for generating a reflectance spectrum estimation transform for transforming a colour of an image into an estimated reflectance spectrum, the apparatus comprising a processor for:
   acquiring an input compensation transform for transforming the colour of the image into an input compensated spectrum; and
   generating the reflectance spectrum estimation transform from the acquired input compensation transform and one or more reference reflectance spectra stored in a database of reference reflectance spectra.

61. The apparatus of claim 60, wherein the processor generates the reflectance spectrum estimation transform by modifying the acquired input compensation transform using the one or more reference reflectance spectra.

62. The apparatus of claim 60, wherein the processor generates the reflectance spectrum estimation transform by finding a non-negative least squares solution to an error function comparing spectra generated from simulated intensity levels for plural different spectral distributions defining the colour of the image that best represent the one or more reference reflectance spectra using the reflectance spectrum estimation transform to be generated with the one or more reference reflectance spectra.

63. An apparatus for estimating a reflectance spectrum comprising the apparatus of claim 60, wherein the processor transforms the colour of the image into an estimated reflectance spectrum using the generated reflectance spectra estimation transform.

64. The apparatus of claim 63, wherein the processor allows selection of a pixel of the image on which the reflectance spectrum estimation is to be based and transforms the colour of the selected pixel into the estimated reflectance spectrum.

65. The apparatus of claim 63, wherein the processor transforms the colour of the image into the estimated reflectance spectrum using the generated reflectance spectrum estimation transform and an/the acquired intensity level compensation coefficient.

66. The apparatus of claim 36, wherein the transform for adjusting the colour of the image is a colour space conversion transform for converting the colour of the image to a new colour space.

67. An apparatus for generating a colour space conversion transform for converting a colour of an image to a new colour space, the apparatus comprising a processor for:
   acquiring an input compensation transform for transforming the colour of the image into an input compensated spectrum; and
   generating the colour space conversion transform from the acquired input compensation transform and one or more reference reflectance spectra in a database of reference reflectance spectra.

68. The apparatus of claim 67, wherein the processor generates the colour space conversion transform by estimating intensity levels for plural different spectral distributions defining colours in the new colour space that best represent the one or more reference reflectance spectra.

69. The apparatus of claim 68, wherein the processor generates the colour space conversion transform from simulated intensity levels estimated using the input compensation transform for plural different spectral distributions defining the colour of the image that best represent the one or more reference reflectance spectra and the intensity levels estimated for the plural different spectral distributions of the new colour space.

70. An apparatus for converting a colour of an image to a new colour space comprising the apparatus of claim 67, wherein the processor converts the colour of the image to the new colour space using the generated colour space conversion transform.

71. The apparatus of claim 36, comprising a computer incorporating the processor.

72. A non-transitory computer readable recording medium that stores a program for performing the method of claim 1.

73. The apparatus of claim 60, comprising a computer incorporating the processor.

74. The apparatus of claim 67, comprising a computer incorporating the processor.

75. A non-transitory computer readable recording medium that stores a program for performing the method of claim 25.

76. A non-transitory computer readable recording medium that stores a program for performing the method of claim 32.

* * * * *